(12) United States Patent
Lindich

(10) Patent No.: US 11,422,513 B2
(45) Date of Patent: Aug. 23, 2022

(54) METHOD OF TRACKING RECORD PLAYER STYLUS ELAPSED PLAY TIME FOR QUALITY AND MAINTENANCE AND STYLUS PLAYTIME CHRONOGRAPH FOR IMPLEMENTING THE SAME

(71) Applicant: Don Lindich, Pittsburgh, PA (US)

(72) Inventor: Don Lindich, Pittsburgh, PA (US)

( * ) Notice: Subject to any disclaimer, the term of this patent is extended or adjusted under 35 U.S.C. 154(b) by 0 days.

(21) Appl. No.: 17/030,931

(22) Filed: Sep. 24, 2020

(65) Prior Publication Data
US 2021/0088977 A1 Mar. 25, 2021

Related U.S. Application Data

(60) Provisional application No. 62/904,919, filed on Sep. 24, 2019.

(51) Int. Cl.
| | | |
|---|---|---|
| *H04R 1/08* | (2006.01) | |
| *G04F 10/00* | (2006.01) | |
| *G06F 3/02* | (2006.01) | |
| *G06F 3/0485* | (2022.01) | |
| *G11B 3/00* | (2006.01) | |
| *G06F 3/04817* | (2022.01) | |

(52) U.S. Cl.
CPC ............... *G04F 10/00* (2013.01); *G06F 3/02* (2013.01); *G06F 3/0485* (2013.01); *G11B 3/007* (2013.01); *H04R 1/08* (2013.01); *G06F 3/04817* (2013.01)

(58) Field of Classification Search
USPC ....................................................... 368/113
See application file for complete search history.

(56) References Cited

U.S. PATENT DOCUMENTS

| | | | | |
|---|---|---|---|---|
| 1,722,027 | A * | 7/1929 | Wente | ...................... G01H 7/00 73/647 |
| 9,244,543 | B1 * | 1/2016 | Sundara-Rajan | ... G06F 3/03545 |
| 9,508,335 | B2 * | 11/2016 | Benattar | .......... G10K 11/17823 |
| 2004/0057344 | A1 * | 3/2004 | Baumann | ............... G11B 19/00 369/18 |
| 2005/0052954 | A1 * | 3/2005 | Riedi | ...................... G04F 10/00 368/110 |
| 2012/0316777 | A1 * | 12/2012 | Kitta | .................. G01C 21/3661 701/431 |
| 2018/0203417 | A1 * | 7/2018 | Sakai | ...................... G04C 17/00 |

FOREIGN PATENT DOCUMENTS

| | | | | | |
|---|---|---|---|---|---|
| GB | | 2045994 A | * | 11/1980 | ............... G11B 3/42 |
| JP | | 55038650 A | * | 3/1980 | |

* cited by examiner

*Primary Examiner* — Henry Orr
(74) *Attorney, Agent, or Firm* — Blynn L. Shideler; Krisanne Shideler; BLK Law Group

(57) ABSTRACT

A method of tracking record player stylus elapsed play time for quality and maintenance utilizes stylus playtime chronograph. The stylus playtime chronograph includes an internal memory that stores elapsed time of an associated stylus, wherein memory of the elapsed time will be maintained on the chronograph even if power supply is interrupted; a display that will display hour truncated elapsed time of an associated stylus; a start button to start and restart the recording of elapsed time of an associated stylus; a stop button to stop or pause the recording of elapsed time of an associated stylus; and a reset button to allow for resetting of the chronograph and allow the chronograph to be used for the another stylus.

1 Claim, 1 Drawing Sheet

METHOD OF TRACKING RECORD PLAYER STYLUS ELAPSED PLAY TIME FOR QUALITY AND MAINTENANCE AND STYLUS PLAYTIME CHRONOGRAPH FOR IMPLEMENTING THE SAME

RELATED APPLICATION

The present application claims the benefit of provisional patent application Ser. No. 62/904,919 filed Sep. 24, 2019 titled "Method of Tracking Record Player Stylus Elapsed Play Time for Quality and Maintenance and Stylus Playtime Chronograph for Implementing the Same" which is incorporated herein by reference.

BACKGROUND OF THE INVENTION

1. Field of the Invention

This invention generally relates to method of tracking record player stylus elapsed play time for quality and maintenance and stylus playtime chronograph for implementing the same.

2. Background Information

Before MP3s, CDs, cassette tapes, and eight-track tapes, there was the record player. Record players revolutionized music and the music industry, even more so than did the later CDs or MP3s. Record players allowed for listening to music at home for the first time; before the record player, it was essentially live or nothing. Record players made such an impression, music releases are still referenced as "records" and "albums," and the spinning album phrase "getting rotation" still means a song is heard on the radio.

Once record players came onto the scene in 1877, they didn't wane until over a century later and they never fully left the market. The audiophile preference for the sound quality has kept vinyl records alive as evidenced by increasing sales of vinyl records since 2007 in what is known as the vinyl revival. See *"Infographic: The LP is Back!" Statista Infographics*. 16 Jul. 2017. In some territories, vinyl records are now more popular than they have been since the late 1980s, and in 2019 vinyl record outsold CDs for the first time in 33 years. Thus the record player remains a critical and vibrant part of the music industry.

A closer look at this amazing game-changing contraption known as the record player is warranted and helpful for fully understanding the application of the present invention.

The Turntable

Although "turntable" and "record player" today are used almost synonymously, a turntable is technically the part of the record player where the record sits. Sometimes the turntable is also called the "revolving platter." The center of the turntable includes a metal rod, holding the record in the center as it turns. The plate of the turntable itself is generally metal, typically covered with plastic or rubber so the record isn't inadvertently scratched.

The least expensive record players use steel for the turntable platter. The steel platters used in record players are light and cheap to produce, however, the consequence is that these plates have a low inertia, meaning any instability with the motor speed are quite pronounced. Steel platters also cannot be used with the moving coil phono cartridges preferred by many audiophiles because they attract strong magnets. A more expensive turntable platter is aluminum. Aluminum platters have better balance and reduce vibration.

The platter's rotation is controlled by the turntable drive system. The two most common types of drive systems are the belt-drive system and the direct-drive system. The belt-drive system goes a long way in reducing noise heard from the motor, because the elastomeric belt helps to absorb vibrations and other low-frequency sounds. A direct-drive system, by contrast, doesn't use intermediary gears, wheels, and belts. The advantage of a direct-drive system is later models had stronger motors and pitch control sliders. For this reason, direct-drive turntables were favored by disc jockeys for decades.

The Stylus

The stylus is the needle that rests against the record. Styluses are commonly made from diamonds and come in many shapes, such as conical, elliptical, line contact, Microline and Shibata. Besides diamonds, sapphire and ruby are also used for record needles. The stylus is attached to a cantilever, which connects it to the cartridge. The cartridge is mounted on the tonearm, which allows the stylus and cartridge to track the record grooves from beginning to end.

The Tone Arm and the Cartridge

The tone arm is the arm of the record player that holds the cartridge, which is responsible for actually producing the sounds. Tone arms can be straight or curved.

As the stylus follows the grooves of the record, vibrations travel through the cantilever and arrive inside the cartridge. The cartridge has an electrical generating system typically composed of magnets and coils, which transforms the vibrations into electrical signals. These electrical signals are sent to a phono preamplifier, which equalizes and amplifies the signal so it can be used with speakers, computers or hi-fi systems.

Amplifiers and Preamplifiers

Most stereo audio receivers include what was called a phono preamplifier (also known as a preamp or phono stage) to boost record player signals to appropriate levels. Most audio-video receivers and entry-level amplifiers lack phono preamps. Some record players include built-in preamps to solve this problem; however many audiophiles insist that you get the best sound quality from a dedicated preamplifier.

Record Player Summary

In short, the vinyl record is placed upon the revolving platter. As the record revolves, the stylus tracks the groove, sending its vibrations up the cantilever and in to the cartridge. The cartridge converts these vibrations into an electrical current using a magnetic field. This current is sent into the phono preamp, which equalizes and boosts the signal. This signal can then be sent to powered speakers or a hi-fi system so the audience can hear whatever is recorded onto the vinyl.

Stylus Replacement

The stylus has been argued to have the toughest and most involved job of all the turntable parts. It is, by design, "right in the trenches" of the records. The stylus is confronting dust and debris within the record grooves (even if one cleans the records). Besides dust and debris, hour upon hour of contact through the course of play wears the stylus, even if it is a diamond.

If the stylus is not replaced when necessary, the effects will be more than just compromised playback. An old and worn stylus could also be damaging the records by having a worn needle gouging micro-chips, or bearing heavily against grooves. A severely misshapen stylus could even start carving into the vinyl.

Depending on materials used, a stylus will typically last between 750 and 2,000 hours, with a few exotic shapes using exotic materials can have a lifespan up to 4,000 hours. A typical stylus will start to demonstrate degraded sound at around 1,000 hours and most manufacturers recommend changing the stylus at around 1,500 hours of record playing time. Thus experts suggest that it's "worth checking the manufacturer's recommended lifespan for your stylus when you get it." Many audiophiles agree that replacing the stylus within its lifespan is essential to preserving one's records and getting the most out of the audio system.

Regarding when to replace a stylus the current industry wisdom asserts that "it's not an exact science, and there are several factors that will affect the rate your stylus will wear." The experts often give warning signs of what to look for identification of the need for stylus replacement, such as:

"If you have access to a high powered microscope, you can take a look at your needle up close for signs of wear. Look out for jagged edges or bends in the needle head. If there's black residue on the needle it may be a sign of overuse and lack of proper care. It may just need a good cleaning, or may need to be replaced;" or "Listen out for a dip in sound quality, there's a chance this could be down to stylus wear. A good way to test it out is to put on a record you're very familiar with (it's probably best if it's not super valuable, just in case). If it is indeed stylus wear that's impairing the sound of your record, the sound will likely be muffled or distorted. You may find the upper mids and treble harder to discern, or have lost the clean 'ting' of a cymbal. Listen out for the presence of a hiss or static on a record where previously there was none. The change in sound quality will be gradual, so you'll want to pay close attention if you think it's about time for a needle change;" or "If the needle is skipping or jumping out of the grooves, you'll definitely be doing some damage to your record, so remove it as soon as possible and don't turn it on again until you've changed your stylus."

The warning signs or indicators of the need stylus replacement are often found AFTER the stylus has begun damaging the records. This can be wholly unacceptable to an audiophile particular with a collection of sometimes irreplaceable records. The most common cause of stylus wear is time, so knowing exactly how many hours a stylus has been in use playing records is the most valuable information the user can have in determining stylus wear and when it is time to replace the stylus.

There is a need to give the audiophile a simple efficient and effective method and apparatus for identifying the time for stylus replacement. Prior to the development of this invention there has been no device optimized for tracking the hours a stylus has been used, as the unique combination of features and functionality are required for the purpose are only found in this invention.

SUMMARY OF THE INVENTION

The various embodiments and examples of the present invention as presented herein are understood to be illustrative of the present invention and not restrictive thereof and are non-limiting with respect to the scope of the invention.

One aspect of the present invention provides a method of tracking record player stylus elapsed play time for quality and maintenance which utilizes a stylus playtime chronograph. The stylus playtime chronograph includes an internal memory that stores elapsed time of an associated stylus, wherein memory of the elapsed time will be maintained on the chronograph even if power supply is interrupted; a display that will display hour truncated elapsed time of an associated stylus; a start button to start and restart the recording of elapsed time of an associated stylus; a stop button to stop or pause the recording of elapsed time of an associated stylus; and a reset button to allow for resetting of the chronograph and allow the chronograph to be used for the another stylus. The method includes the steps of pushing the start button when the tonearm upon which an associated stylus is position is lowered to play a record, wherein the elapsed time will be maintained by the chronograph and the truncated hours displayed on the display; and pushing the stop button when the tonearm upon which an associated stylus is position is raised to stop play of a record, wherein the recording of elapsed time will be stopped by the chronograph.

These and other advantages of the present invention are described below in connection with the attached figures in which like reference numerals represent like elements throughout.

DESCRIPTION OF THE PREFERRED EMBODIMENTS

Figure 1:
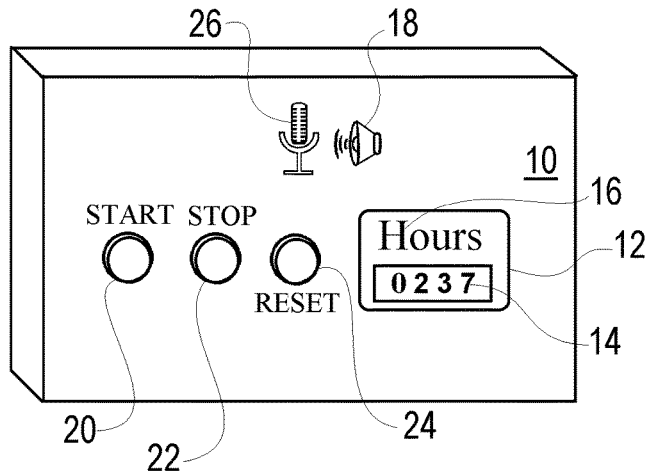
FIG. 1 is a schematic view of a stylus playtime chronograph according to one embodiment of the present invention and used in the method of tracking record player stylus elapsed play time for quality and maintenance according to the present invention.
Figure 2:
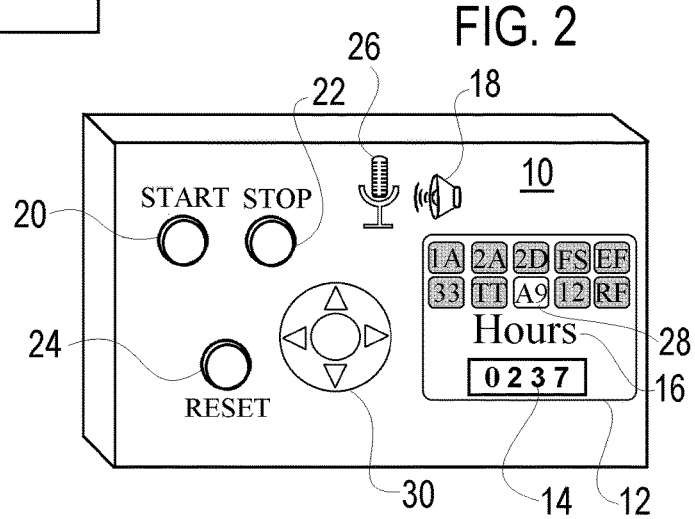
FIG. 2 is a schematic view of a stylus playtime chronograph according to a modified embodiment of the present invention and used in the method of tracking record player stylus elapsed play time for quality and maintenance according to the present invention.
Figure 3:
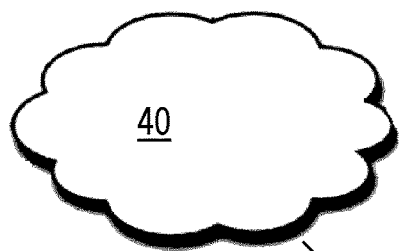
FIG. 3 is a schematic view of a stylus playtime chronograph according to a modified embodiment of the present invention and used in the method of tracking record player stylus elapsed play time for quality and maintenance according to the present invention.
Figure 3:
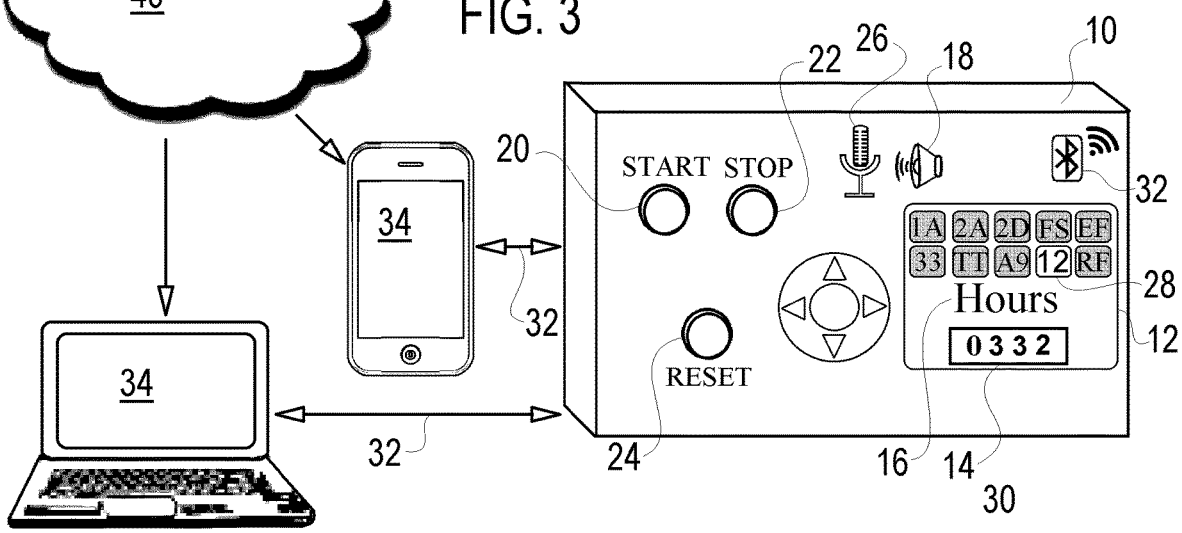

FIGS. 1-3 are schematic views of two stylus playtime chronographs 10 according to two embodiments of the present invention with each usable in a method of tracking record player elapsed stylus play time for quality and maintenance according to the present invention. The device 10 is a specialized chronograph 10 used to track usage of phonograph cartridges and their styluses, as used on turntables for playing vinyl records.

There are multiple reasons it is desirable to track the amount of time and use of a stylus. One reason is wear, as depending on the shape and material used for the stylus tip, a stylus may last between 750 and 4,000 hours before needing replacement. Using a worn stylus will diminish sound quality and may damage records. Another reason in break-in, in that new styluses and cartridges require break-in to sound their best due to the mechanical properties of their physical materials and the way they are assembled. Therefore, by tracking stylus usage precisely the owner can also make note of changes in sound over time, for example noting an improvement in sound quality after 15 hours of use and full break-in at 35 hours of use. Such information is commonly shared by vinyl record hobbyists on internet message boards, thus the ability to easily track such information accurately is important. Another reason is simple economics, in that replacing a cartridge before it is necessary incurs an unnecessary expense, and high-end phonograph cartridges can cost $10,000 or more, while waiting too long can damage a user's valuable record collection. A precise device and associated method of stylus usage measurement allows users to maximize and protect their investments.

It may be helpful to define the term chronograph. The term chronograph comes from the Greek khronográphos or "time recording", from khrónos meaning "time" and gráph ō meaning "to write". Early versions of the chronograph are the only ones that actually used any "writing": marking the dial with a small pen attached to the index so that the length of the pen mark would indicate how much time had elapsed. The first modern chronograph was invented by Louis Moinet in 1816, solely for working with astronomical equipment. In 1844 Adolphe Nicole's updated version of the chronograph was the first to include a re-setting feature which now allowed successive measurements, unlike the constantly moving needle in the original chronograph. Chronographs were very popular with early aviators as they allowed them to make rapid calculations and conduct precise timing. The stylus playtime chronographs 10 of the present invention are chronographs in the traditional sense as they measure the elapsed playtime of the stylus of a record player.

FIG. 1 Chronograph 10

As noted above FIG. 1 is a schematic view of a stylus playtime chronograph 10 according to one embodiment of the present invention. The chronograph 10 has an internal memory that stores elapsed time in hours minutes and seconds, and the power source may be battery or through conventional electrical plugs. The memory of the elapsed time (till a resetting of the chronograph 10) will be maintained if power supply is interrupted, such as changing out a battery for the chronograph 10 or moving from one electrical plug to another (or a power outage). It is critical for the memory of the elapsed time display to be maintained in that the elapsed time is intended to be in the hundreds and thousands of hours extending over a prolonged period.

The chronograph 10 has a display 12 that will display elapsed time in hours on a 4-digit display 14 that displays hour truncated elapsed time (i.e. the total elapsed time in 1 hour increments) up to 9,999 hours. Cartridge manufacturers and end users estimate replacement time and discuss stylus usage in hours, such that minutes and seconds are not particularly useful in the display 12. It is possible for the device 10 to display the hours to the nearest hour of recorded time (i.e. display the rounded hour elapsed time), but the truncated time is deemed more applicable to the particular usage of the device 10 and that preferred by audiophiles.

The display 12 may also include visible hour indicator 14 to clearly convey what is being recorded. The indicator 14 can be used to help convey other information, such as display a resetting indication when the device 10 is being reset by the user to help avoid accidental resets of the device 10 before it is intended to be reset. A speaker 18 is provided and can include audible tones indicative of usage, namely an audible tone which indicates start and stop of the chronograph 10, and even a distinct tone indicating a resetting procedure of the chronograph 10 can be possible.

The chronograph 10 includes a start button 20 to start and restart the recording of elapsed time, and a stop button 22 to stop or pause the recording of elapsed time. It is possible to combine these functions into the same button, but separating the buttons does make operation clearer for the user.

The chronograph 10 includes a reset button 24 to allow for resetting of the chronograph 10 and allow the device 10 to be used for the next stylus. The operation of the reset button 24 should be more involved than a single press to minimize accidental resetting of the chronograph 10, such as requiring the button 24 to be depressed for a full 10 seconds to effect reset of the device 10.

Operation Chronograph 10

In operation with the device 10, when the tonearm is lowered to play the record, the user pushes the start button 20 on the chronograph 10 and the speaker 18 may beep once. The elapsed time will be maintained by the chronograph 10 and the truncated hours displayed on the 4 digit display 14 of display 12.

Because the chronograph digits only change once per hour, it is necessary for the user to be able to verify the operating status. For example, if the user does not recall if they pushed stop after playing a record, they can check the display for the blinking indicator that shows the chronograph is actively recording time. There may be alternative visual indicators that the device 10 is actively recording elapsed time, for example in another example the hour indicator 14 may be flashing to indicate the recording status. In another indicator example the hours displayed on the 4 digit display 14 of display 12 may only be visible a) when the device 10 is recording elapsed time, and b) when the stop button 22 is depressed. In this second example, alternative b) is provided to show the elapsed time such that when the device 10 is not actively recording elapsed play time of the stylus the user can still check the truncated hours by holding down the stop button 22—which will not start the timer but will only display the truncated elapsed time while the button 22 is depressed.

In operation of the chronograph 10, when the tonearm is raised at the end of play, the user pushes the stop button 22 and the chronograph speaker 18 can beep twice. Again the total elapsed time including partial hours are recorded in the memory until the next time the chronograph 10 is active, so all time in use is recorded and maintained on the device 10.

The device 10 may operate from battery (preferably) or be a plug in device operating from conventional power plugs. If a battery powered then the lifespan of the stylus will often exceed the useful life of the chronograph battery, unless the turntable and chronograph 10 are in substantially continuous use, for example by a DJ or a radio station. If the device 10 is plugged in for power access, then the device 10 must also assume a high likelihood of electrical power interruptions before the total life of the stylus is recorded. For these reasons the chronograph 10 must remember the elapsed time when the power supply is interrupted, such as when the battery is removed. When a fresh battery is placed in the chronograph 10 (or power is otherwise restored) the user can resume tracking stylus life where they left off.

Finally as noted above the operation of the reset button 24 is more involved than merely pushing the button 24 in order to minimize accidental resetting of the chronograph 10. One alternative is requiring the button 24 to be depressed for a full 10 seconds to effect reset of the device 10. Another alternative is to depress button 24 with another button (20 or 22) but not the third (22 or 20) for an extended period (say 3 seconds) for resetting. This latter arrangement avoids the resetting if something leans against the button 24 causing it to be depressed, because such an accident would need the accidental depressing of two spaced buttons and not a third, making it highly unlikely.

Automatic Use

To automate operation, a sensor 26 such as microphone can be incorporated into the chronograph that will start the recording process when the stylus is being used, namely the music (or other recorded sound) begins to play, and stop the process when the music (or sound) stops. An AI algorithm may be incorporated into the chronograph 10 to analyze the ambient noise and distinguish music/recorded sound from background sounds.

Alternative sensors 26 may be used and the microphone is simply one example. For example a sensor 26 (such as a power sensor) that indicates when the turntable is moving and the tone arm is not in the stored position could be used. A position type sensor 26 that indicates when the tone arm has moved to an engaged position could be used. There are a large number of possibilities for automating sensors 26. The advantage of the microphone 18 and associated intelligent control is that no modification of the turntable is required and the only requirement is that the device 10 be placed is a designated proximity to the turntable speaker.

Automated usage would seem to have clear practical advantages as it does not require active manipulation by the user. However audiophiles do represent a unique market audience and the greater control offered by, and the greater user attention required by, the manual version of the chronograph 10 may actually be preferred by many audiophiles.

FIG. 2 Chronograph 10

FIG. 2 is a schematic view of a stylus playtime chronograph 10 according to a modified embodiment of the present invention. The chronograph of FIG. 2 includes all the elements of FIG. 1 discussed above and is used in the method of tracking record player stylus elapsed play time for quality and maintenance according to the present invention generally as described above.

The chronograph 10 of FIG. 2 is for the user who owns more than one phono cartridge, and it is provided with separate channels 28 (represented by icons on the display 12) for tracking multiples styluses. In addition to the above operation, the user selects the stylus to be tracked by using an arrow pad on controller 30 to select "Stylus 1" or "Stylus 2," etc. icons on the display 12 (up to the number of channels 28 of the device) The alphanumeric display 10 may also allow the user to name each stylus recording channel 28 independently by make and model. The start and stop and reset functions will work as described above for the currently indicated channel 28. The internal memory must maintain a record of the elapsed time for each channel 28.

For "Automatic" operation of the chronograph 10 of FIG. 2 through use of sensor(s) 18, if provided, the sensor 18 must be able to distinguish or identify the specific stylus with the channel 28 that is being used. Multiple sensors 18 each tied to a stylus associated with one channel could be possible. RFID tags attachable to each stylus housing would be a further possibility to supplement the sensors 18 and give indication of which stylus or channel 28 should be recorded. Essentially it is important that the "automatic" operation not have any reasonable likelihood of recording time on the "wrong" channel because that would eliminate the advantage of the device 10. The automatic operation of the chronograph 10 of FIG. 2 is more complex than the automation of the chronograph of FIG. 1, and as noted above a manual operation may actually be preferred by many audiophiles.

A further modification is that a countdown option may be incorporated in the chronograph 10. For example, if the user has a cartridge with an expected lifespan, for example 1,500 hours, they can program the expected lifespan along with the custom name for the stylus. They can then scroll through the stylus names and view both the elapsed time and the time remaining before replacement.

FIG. 3 Chronograph 10

FIG. 3 is a schematic view of a stylus playtime chronograph 10 according to a modified embodiment of the present invention. The chronograph of FIG. 3 includes all the elements of FIGS. 1 and 2 discussed above and is used in the method of tracking record player stylus elapsed play time for quality and maintenance according to the present invention generally as described above.

The embodiment of FIG. 3 further adds a Bluetooth compatibility 32 with a user device 34, such as a lap top or smart phone. In this embodiment the user can download an application (App) from the cloud (web) 40 that is associated with the device 10. The user can use their coupled or paired user device 34 to control the chronograph 10 and to display the relevant hours (for a channel) from the chronograph 10. Additionally the downloadable app can include information from specific manufacturers that the chronograph 10 can use to give the user indications on their user device 34 of when the stylus needs replaced or merely maintenance. For example there may be a notice sent by the chronograph to the user device 34 to inspect the associated stylus every 200 hours of use and replace the associated stylus after 1200 hours for a particular brand of stylus associated with a given channel.

The above description is representative of the present invention but not restrictive thereof. The full scope of the present invention are set forth in the appended claims and equivalents thereto.

What is claimed is:

1. A stylus playtime chronograph comprising:
an internal memory that stores elapsed time of an associated stylus, wherein memory of the elapsed time will be maintained on the chronograph even if a power supply to the chronograph is interrupted;
a display that will display hour truncated elapsed time of an associated stylus;
a start button to start and restart a recording of elapsed time of an associated stylus;
a stop button to stop or pause the recording of elapsed time of an associated stylus; and
a reset button to allow for resetting of the chronograph and allow the chronograph to be used for another stylus,
further including at least one sensor incorporated into the chronograph that will start the recording when the associated stylus begins being used, and stop the recording when the associated stylus stops being used, wherein at least one sensor is a microphone, and wherein the chronograph further includes an algorithm to analyze an ambient noise and distinguish music/recorded sound from background sounds.

* * * * *